United States Patent
Kim et al.

(10) Patent No.: US 11,895,758 B2
(45) Date of Patent: Feb. 6, 2024

(54) COOKING APPARATUS AND METHOD THEREOF

(71) Applicant: LG Electronics Inc., Seoul (KR)

(72) Inventors: Euisung Kim, Seoul (KR); Jaewoo Lee, Seoul (KR); Hyunwook Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 17/178,991

(22) Filed: Feb. 18, 2021

(65) Prior Publication Data
US 2021/0259059 A1    Aug. 19, 2021

(30) Foreign Application Priority Data

Feb. 18, 2020 (KR) .................. 10-2020-0019888

(51) Int. Cl.
*H05B 6/04* (2006.01)
*H05B 6/12* (2006.01)
*H05B 6/06* (2006.01)
*H05B 6/08* (2006.01)

(52) U.S. Cl.
CPC .......... *H05B 6/04* (2013.01); *H05B 6/062* (2013.01); *H05B 6/08* (2013.01); *H05B 6/1281* (2013.01)

(58) Field of Classification Search
CPC . H05B 6/08; H05B 6/062; H05B 6/04; H05B 6/1281; H05B 2213/05; Y02B 70/10
See application file for complete search history.

(56) References Cited

U.S. PATENT DOCUMENTS

2009/0120928 A1* 5/2009 Lee .............. H05B 6/062 219/626
2013/0082046 A1* 4/2013 Ogasawara ........ H05B 6/062 219/625

FOREIGN PATENT DOCUMENTS

| EP | 2437573 | 4/2012 |
| EP | 2533605 | 12/2012 |
| EP | 3481147 | 5/2019 |
| KR | 1020180040406 | 4/2018 |
| KR | 101905662 | 10/2018 |
| KR | 101905662 B1 * | 10/2018 ............... H05B 6/06 |

OTHER PUBLICATIONS

European Search Report in European Appln. No. 21157859.6, dated Jul. 1, 2021, 6 pages.

* cited by examiner

*Primary Examiner* — Dana Ross
*Assistant Examiner* — Kuangyue Chen
(74) *Attorney, Agent, or Firm* — Fish & Richardson P.C.

(57) ABSTRACT

A cooking apparatus includes: a working coil, an inverter configured to output a resonant current to the working coil, a current detector configured to detect the resonant current and output a detection value corresponding to the resonant current, and a controller. The controller is configured to control the inverter to flow a first resonant current through the working coil, control the inverter to flow, through the working coil, a second resonant current having a frequency different from the first resonant current, and determine, based on a difference between a first detection value for the first resonant current and a second detection value for the second resonant current, whether a target object that is located adjacent to the working coil is a predetermined object.

10 Claims, 9 Drawing Sheets

COOKING APPARATUS AND METHOD THEREOF

CROSS-REFERENCE TO RELATED APPLICATION

The present disclosure claims priority to and the benefit of Korean Patent Application No. 10-2020-0019888, filed on Feb. 18, 2020, in the Korean Intellectual Property Office, the disclosure of which is incorporated herein by reference in its entirety.

TECHNICAL FIELD

The present disclosure relates to a cooking apparatus and a method thereof, and more particularly, to a cooking apparatus for determining a material of an object to be heated, and a method thereof.

BACKGROUND

A cooking apparatus is one of household appliances for cooking food, and can refer to an appliance installed in a kitchen to cook food according to a user's intention.

Among the cooking apparatus, the market size of electric ranges is gradually expanding. This is because the electric range does not generate carbon monoxide, and the risk of safety accidents such as gas leakage and fire is low.

Generally, the electric ranges include a Hi-Light type electric range and an induction type electric range. The Hi-Light type electric range converts electricity into heat by using a nichrome wire with high electrical resistance. The induction type electric range is a cooking heating device using the principle of induction heating that uses an electric magnetic field.

The induction type electric range generates a strong magnetic field line by passing a high-frequency current through a working coil provided therein. For example, when the magnetic field line, which are generated by the working coil passes through a cooking tool such as a metal pot, an eddy current is formed in the cooking tool. In addition, as the eddy current flows through the cooking tool, heat is generated so that the cooking tool itself is heated, and the contents of the cooking tool are also heated.

Conventionally, the cooking apparatus determines whether a material of an object to be heated is a magnetic material that is relatively easy to form an eddy current or a non-magnetic material that is relatively difficult to form an eddy current. Through this, the cooking apparatus prevents damage to internal elements of the cooking apparatus and reduces safety problems by performing an appropriate control for heating according to the material of the object to be heated.

However, the conventional cooking apparatus only determines whether the material of the object to be heated is magnetic or nonmagnetic, and cannot accurately determine whether the object is a predetermined specific cooking tool optimized for the cooking apparatus.

Accordingly, the conventional cooking apparatus has a problem that it is difficult to properly cook food according to an intention of the user by controlling an output for heating the food based on whether the object is a specific cooking tool optimized for the cooking apparatus.

SUMMARY

The present disclosure is directed to a cooking apparatus and a method thereof.

According to one aspect of the subject matter described in this application, a cooking apparatus includes a working coil, an inverter configured to output a resonant current to the working coil, a current detector configured to detect the resonant current and output a detection value corresponding to the resonant current, and a controller. The controller can be configured to control the inverter to flow a first resonant current through the working coil, control the inverter to flow, through the working coil, a second resonant current having a frequency different from the first resonant current, and determine, based on a difference between a first detection value for the first resonant current and a second detection value for the second resonant current, whether a target object that is located adjacent to the working coil is a predetermined object.

Implementations according to this aspect can include one or more of the following features. For example, the controller can be configured to determine whether a material of the target object is magnetic.

In some examples, the controller can be configured to determine, based on the first detection value being greater than or equal to a predetermined reference value, whether the material of the target object is magnetic, and determine, based on the difference between the first detection value and the second detection value is greater than or equal to a predetermined difference, whether the target object is the predetermined object.

In some examples, the controller can be configured to stop the inverter based on the material of the target object being non-magnetic or the target object not being the predetermined object. In some implementations, the controller can be configured to control, based on the material of the target object being magnetic and the target object being the predetermined object, the inverter according to a preset control value for the predetermined object.

In some implementations, the controller can be configured to determine, based on the material of the target object being magnetic, whether the target object is the predetermined object. In some examples, the cooking apparatus can further include a voltage detector configured to detect an input voltage to the cooking apparatus and the controller can be configured to compensate the first detection value based on the detected input voltage, and determine, based on the compensated first detection value, whether the material of the target object is magnetic.

In some examples, the controller can be configured to compensate the second detection value based on the detected input voltage, and determine, based on a difference between the compensated first detection value and the compensated second detection value, whether the target object is the predetermined object. In some implementations, the cooking apparatus can further include an output unit including at least one of a display or a speaker, and the controller can be configured to: output, based on the material of the target object being non-magnetic, a message indicating that the target object has non-magnetic material through the output unit, and output, based on the target object not being the predetermined object, a message instructing a user to use the predetermined object through the output unit.

In some implementations, the current detector can include at least one of a current sensor, a current transformer, or a shunt resistor. In some examples, the voltage detector can include at least one of a voltage transformer, a resistance element, or an operational amplifier.

According to another aspect of the subject matter described in this application, a method of operating a cooking apparatus that includes a working coil and an inverter configured to output a resonant current to the working coil, comprises controlling the inverter to flow a first resonant current through the working coil, controlling the inverter to flow, through the working coil, a second resonant current having a frequency different from the first resonant current, and determining, based on a difference between a first detection value for the first resonant current and a second detection value for the second resonant current, whether a target object located adjacent to the working coil is a predetermined object.

Implementations according to this aspect can include one or more following features. For example, the method can further include determining whether a material of the target object is magnetic.

In some examples, the method can further include determining whether the material of the target object is magnetic comprises determining, based on the first detection value being greater than or equal to a predetermined reference value, the material of the target object as magnetic. Determining whether the target object is the predetermined object can include determining, based on the difference between the first detection value and the second detection value being greater than or equal to a predetermined difference, the target object as the predetermined object.

In some implementations, the method can further include stopping, based on the material of the target object being non-magnetic or the target object not being the predetermined object, the inverter. In some examples, the method can further include controlling, based on the material of the target object being magnetic and the target object being the predetermined object, the inverter according to a preset control value for the predetermined object.

In some examples, determining whether the target object is the predetermined object can include determining, based on the material of the target object being magnetic, whether the target object is the predetermined object. In some examples, determining whether the material of the target object is magnetic can include compensating the first detection value based on an input voltage supplied to the cooking apparatus, and determining, based on the compensated first detection value, whether the material of the target object is magnetic.

In some implementations, determining whether the target object is the predetermined object includes compensating the second detection value based on the input voltage, and determining, based on a difference between the compensated first detection value and the compensated second detection value, whether the target object is the predetermined object. In some examples, the method can further include outputting, through an output unit including at least one of a display or a speaker and based on the material of the target object being non-magnetic, a message indicating that the target object has non-magnetic material, and outputting, through the output unit and based on the target object not being the predetermined object, a message instructing a user to use the predetermined object.

BRIEF DESCRIPTION OF THE DRAWINGS

FIGS. 3A and 3B to 5 are diagrams referred to in explaining an operation of the exemplary cooking apparatus.

DETAILED DESCRIPTION

Figure 1:
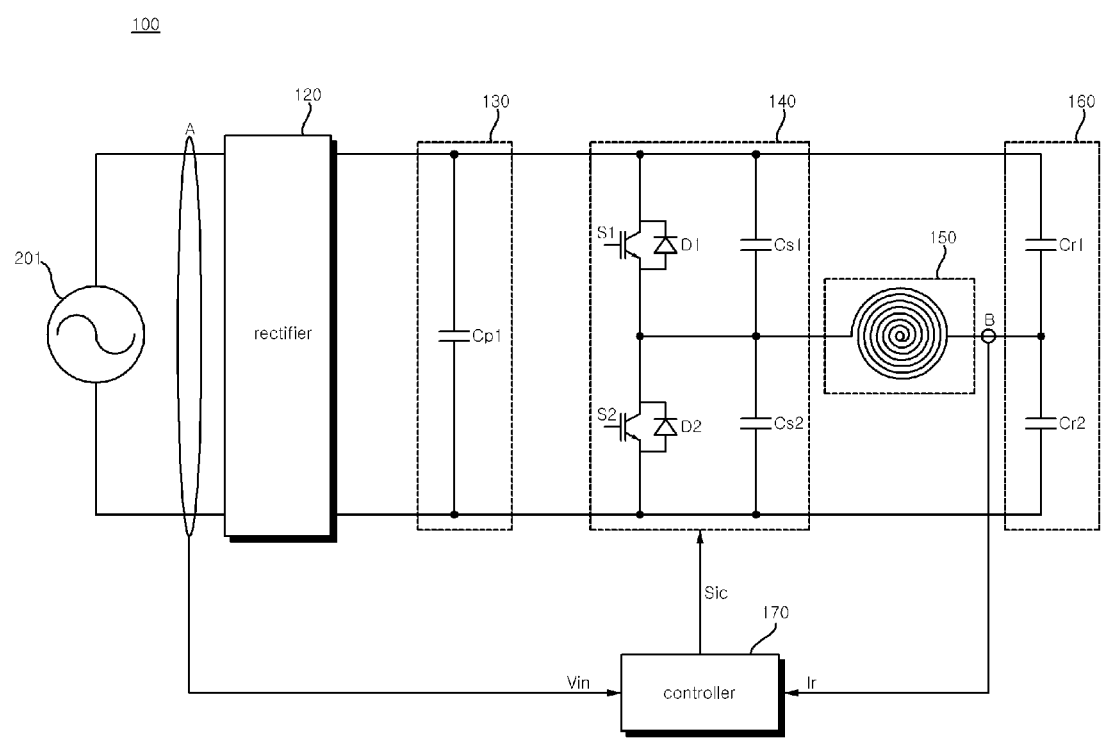
FIG. 1 is a diagram illustrating an internal circuit of an exemplary cooking apparatus.

FIG. 1 is a diagram illustrating an internal circuit of an exemplary cooking apparatus 100.

Referring to FIG. 1, the cooking apparatus 100 cab include a rectifier 120 connected to an external power source, a DC capacitor 130, an inverter 140, a working coil 150, a resonator 160, and a controller 170. The cooking apparatus 100 can further include a voltage detector A and a current detector B.

The rectifier 120 can rectify power supplied from an external power source and output and the rectified power. The external power source can be a commercial power supply 201 that supplies AC power.

The rectifier 120 can convert an AC voltage supplied from the commercial power supply 201 into a DC voltage. For example, the commercial power supply 201 can be a single-phase AC power or a three-phase AC power.

The rectifier 120 can include a bridge diode having two or three pairs of upper arm diode elements and lower arm diode elements that are connected in series to each other. The rectifier 120 can further include a plurality of switching elements.

The DC capacitor 130 can be connected to a DC terminal, which is an output terminal of the rectifier 120, and can store DC power supplied from the rectifier 120. For example, the voltage applied to both ends of the DC capacitor 130 can refer to a DC terminal voltage Vdc.

In some implementations, a plurality of elements can be provided to ensure device stability.

The inverter 140 can include a plurality of switching elements S1 and S2. The inverter 140 can convert the DC power stored in the DC capacitor 130 into AC power of a predetermined frequency according to an operation of the switching elements S1 and S2 and output the converted AC power to the working coil 150.

For example, when the switching elements S1 and S2 are insulated gate bipolar transistor (IGBT), a switching signal Sic generated by the pulse width modulation (PWM) signal can be output from the controller 170 and can be input to the gate terminals of the switching elements S1 and S2. By way of further example, by turning on/off the switching elements S1 and S2 according to the switching signal Sic, a resonant current Ir, which is a high-frequency current, can be output from the inverter 140 and can flow through the working coil 150.

When the resonant current Ir output from the inverter 140 flows through the working coil 150 in a state in which an object to be heated is located close to the working coil 150, a magnetic line of force generated by the resonant current Ir flowing through the working coil 150 can pass through the object. For example, an eddy current can be provided in the object by the magnetic line of force passing through the object, and heat can be generated by the eddy current provided in the object.

Snubber capacitors Cs1 and Cs2 can be included to reduce the inrush current or transient voltage generated in the switching elements S1 and S2, and in some cases, can be used for removing electromagnetic noise.

In some implementations, by adjusting a saturation voltage increase rate while the switching elements S1 and S2 are turned off, the snubber capacitors Cs1 and Cs2 can affect the energy loss during turn-off.

The working coil 150 can have a round shape, a circular sector shape, or a polygonal shape such as a triangular shape or a square shape, but its shape is not limited thereto.

The resonator 160 can include a plurality of capacitors Cr1 and Cr2 connected between the DC terminal and the working coil 150. For example, the capacitances of the first resonance capacitor Cr1 and the second resonance capacitor Cr2 can be the same.

For example, the first resonance capacitor Cr1 can have a first end connected to a first end of the DC capacitor 130 and a second end connected to a node to which the second resonance capacitor Cr2 and the working coil 150 are connected. By way of further example, the second resonance capacitor Cr2 can have a first end connected to a second end of the DC capacitor 130 and a second end connected to a node to which the first resonance capacitor Cr1 and the working coil 150 are connected.

Based on a resonant frequency of a resonance curve, the cooking apparatus 100 can use a frequency band greater than the resonant frequency. For example, the cooking apparatus 100 can change the heating power level of the cooking apparatus 100 by changing a used frequency within the frequency band.

For example, the cooking apparatus 100 can determine any one of the frequencies within the frequency band of 20 kHz to 75 kHz as a switching frequency of the switching elements S1 and S2 included in the inverter 140. In some implementations, the cooking apparatus 100 can control the switching elements S1 and S2 to be alternately turned on/off according to the determined switching frequency.

The voltage detector A can detect an input voltage Vin, which is a voltage input to the cooking apparatus 100. In some implementations, the voltage detector A can include a voltage transformer (VT), a resistance element, an operational amplifier (op amp), and the like.

A detection value for the input voltage Vin detected through the voltage detector A can be input to the controller 170. For example, the detection value for the input voltage Vin can be input to the controller 170 as a discrete signal in the form of a pulse.

In some implementations, the voltage detector A can be connected to both ends of the DC capacitor 130.

The current detector B can detect the resonant current Ir flowing through the working coil 150. In some implementations, the current detector B can include a current sensor, a current transformer (CT), a shunt resistor, and the like.

A detection value for the resonant current Ir detected through the current detector B can be input to the controller 170. For example, the detection value for the resonant current Ir can be input to the controller 170 as a discrete signal in the form of a pulse.

The current detector B can be connected between the inverter 140 and the working coil 150.

The controller 170 can be connected to each component provided in the cooking apparatus 100 and control the overall operation of each component.

The controller 170 can control the operation of the inverter 140 so that the resonant current Ir flows through the working coil 150. For example, the controller 170 can output the switching signal Sic for controlling the operation of the switching elements S1 and S2 to the inverter 140, so that the resonant current Ir flows through the working coil 150.

In some implementations, the controller 170 can change the frequency of the resonant current Ir by adjusting the switching signal Sic to change the switching period of the switching elements S1 and S2.

The controller 170 can determine the material of the object to be heated based on the detection value received from the voltage detector A and/or the current detector B, and can control the operation of the inverter 140 based on the result of determining the material of the object to be heated.

For example, the material of the object to be heated can be a magnetic material (e.g. iron) having high heating efficiency even when a relatively small high-frequency current is passed through it, or a non-magnetic material (e.g. aluminum) that needs to flow a relatively large high-frequency current due to low heating efficiency.

For example, the controller 170 can control the operation of the inverter 140 so that a first resonant current having a first frequency flows through the working coil 150. In some implementations, a detection value for the first resonant current output from the current detector B can be input to the controller 170.

The controller 170 can determine the material of the object to be heated based on the detection value for the first resonant current. In some implementations, the detection value for the first resonant current can be the magnitude of the first resonant current.

For example, when the magnitude of the first resonant current is greater than or equal to a predetermined magnitude, the controller 170 can determine the object to be heated as a magnetic object. By way of further example, when the magnitude of the first resonant current is less than a predetermined magnitude, the controller 170 can determine the object to be heated as a non-magnetic object.

In some implementations, the controller 170 can control the inverter 140 to stop its operations when the controller 170 determined that the object to be heated is a non-magnetic object. For example, the controller 170 can stop outputting the switching signal Sic that controls the operation of the switching elements S1 and S2 when it is determined that the object to be heated is a non-magnetic object.

The controller 170 can determine whether the object to be heated is a predetermined specific cooking tool based on the detection value received from the voltage detector A and/or the current detector B.

The controller 170 can control the operation of the inverter 140 based on a result of determining whether the object to be heated is the predetermined specific cooking tool. For example, the predetermined specific cooking tool can be a dedicated container optimized for the cooking apparatus 100.

The controller 170 can control the operation of the inverter 140 so that resonant currents having different frequencies sequentially flow through the working coil 150. In some implementations, detection values for resonant currents having different frequencies output from the current detector B can be sequentially input to the controller 170.

For example, the controller 170 can control the operation of the inverter 140 so that a first resonant current having a first frequency and a second resonant current having a second frequency sequentially flow through the working coil 150. In some implementations, the first frequency and the second frequency can be greater than the resonant frequency of the cooking apparatus 100.

The controller 170 can determine whether the object to be heated is the predetermined specific cooking tool based on a detection value for each of the resonant currents having different frequencies. In some implementations, the detection value for each of the resonant currents having different frequencies can be the magnitudes of each of the resonant currents having different frequencies.

For example, when the difference between the magnitude of the first resonant current and the magnitude of the second resonant current is greater than or equal to a predetermined difference, the controller 170 can determine that the object to be heated is the predetermined specific cooking tool. For example, when the difference between the magnitude of the first resonant current and the magnitude of the second resonant current is less than a predetermined difference, the controller 170 can determine that the object to be heated is not the predetermined specific cooking tool.

In some implementations, when it is determined that the object to be heated is the predetermined specific cooking tool, the controller 170 can control the operation of the inverter 140 based on a preset control value for the predetermined specific cooking tool. In some implementations, the controller 170 can control the inverter 140 to stop operating when it is determined that the object to be heated is not the predetermined specific cooking tool.

The controller 170 can compensate a detection value for the resonant current Ir based on the input voltage Vin detected through the voltage detector A.

For example, the voltage value of the AC power supplied from the commercial power supply 201 can vary by ±15% based on 220V. In some implementations, the controller 170 can compensate the detection value for the resonant current Ir based on a compensation equation for a variation in the voltage value of the AC power supplied from the commercial power supply 201. For example, the compensation equation can be an equation based on a predetermined reference voltage (e.g. 220V).

The controller 170 can determine the material of the object to be heated based on the detection value for the resonant current Ir compensated based on the input voltage Vin. The controller 170 can determine whether or not the object to be heated is the predetermined specific cooking tool based on the detection value for the resonant current Ir compensated based on the input voltage Vin.

The cooking apparatus 100 can further include an output unit. The output unit can include a display device such as a display or a light emitting diode (LED), and/or an audio device such as a speaker or a buzzer.

The controller 170 can output a message for the non-magnetic material through the output unit when it is determined that the material of the object to be heated is non-magnetic.

The controller 170 can output a message instructing use of the predetermined specific cooking tool through the output unit when it is determined that the object to be heated is not the predetermined specific cooking tool.

The controller 170 can output a message for stopping the operation of the cooking apparatus 100 through the output unit when it is determined that the material of the object to be heated is non-magnetic, or when it is determined that the object to be heated is not the predetermined specific cooking tool.

The cooking apparatus 100 can further include an input unit. The input unit can include an input device (e.g. a switch, a touch panel, etc.) that is capable of receiving a user input.

The controller 170 can receive an input for turning on/off the cooking apparatus 100, an input for adjusting the heat power through the input unit, and/or an input for adjusting a time for heating the object to be heated.

Figure 2:
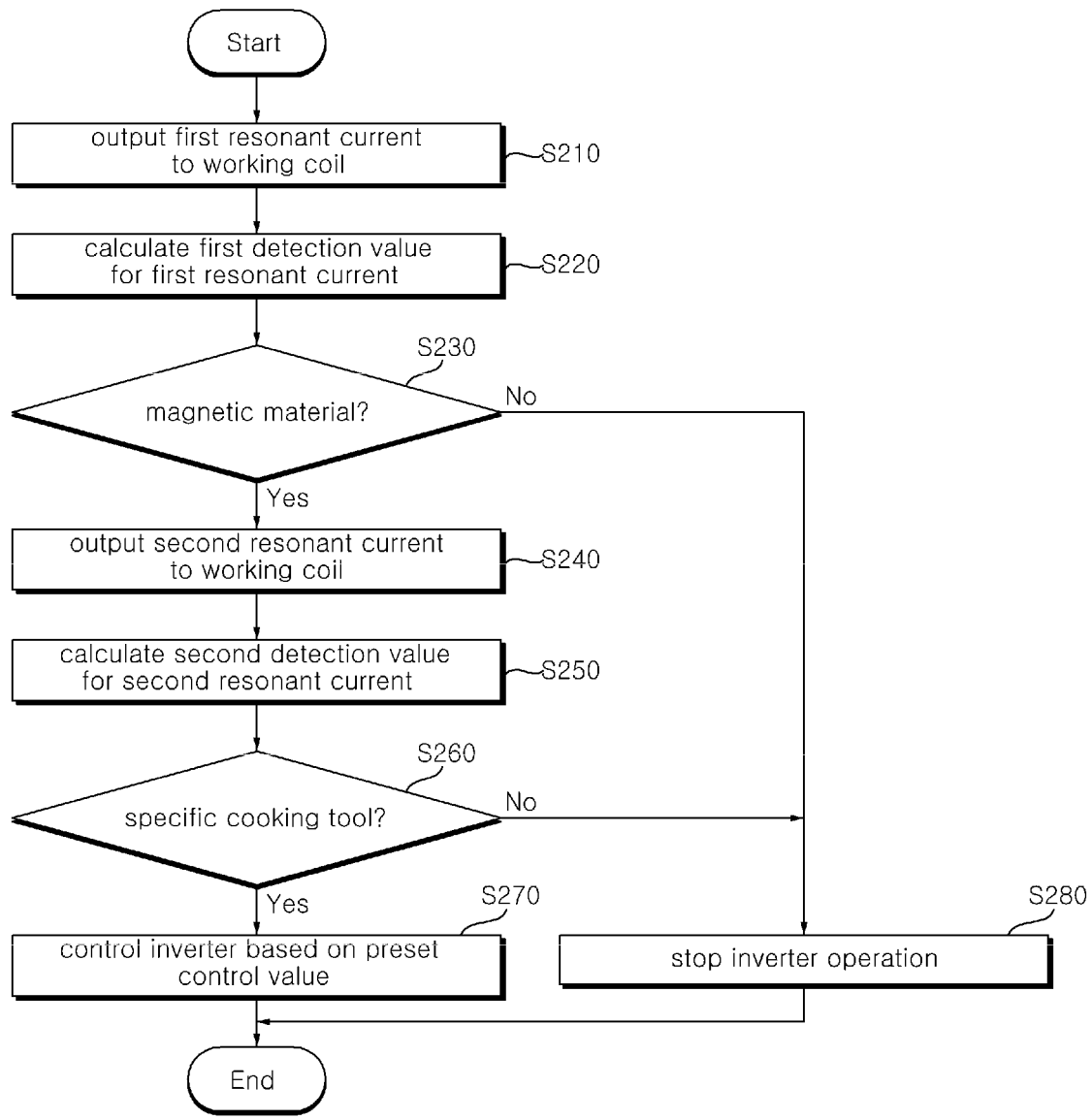
FIG. 2 is a flow chart of an exemplary method for a cooking apparatus.

FIG. 2 is a flow chart of a method for the exemplary cooking apparatus 100. FIGS. 3A to 5 are diagrams referred to in explaining an operation of the exemplary cooking apparatus.

Referring to FIG. 2, in operation S210, the cooking apparatus 100 can control the inverter 140 so that a first resonant current having a first frequency flows through the working coil 150. For example, the cooking apparatus 100 can control the switching elements S1 and S2 included in the inverter 140 so that the first resonant current having the first frequency flows through the working coil 150.

In operation S220, the cooking apparatus 100 can calculate a first detection value for the first resonant current. For example, the cooking apparatus 100 can calculate a magnitude of the first resonant current as the first detection value based on the detection value for the first resonant current output from the current detector B.

In some implementations, the cooking apparatus 100 can calculate the first detection value for the first resonant current by compensating the detection value for the resonant current Ir based on the input voltage Vin detected through the voltage detector A.

Figure 3A:
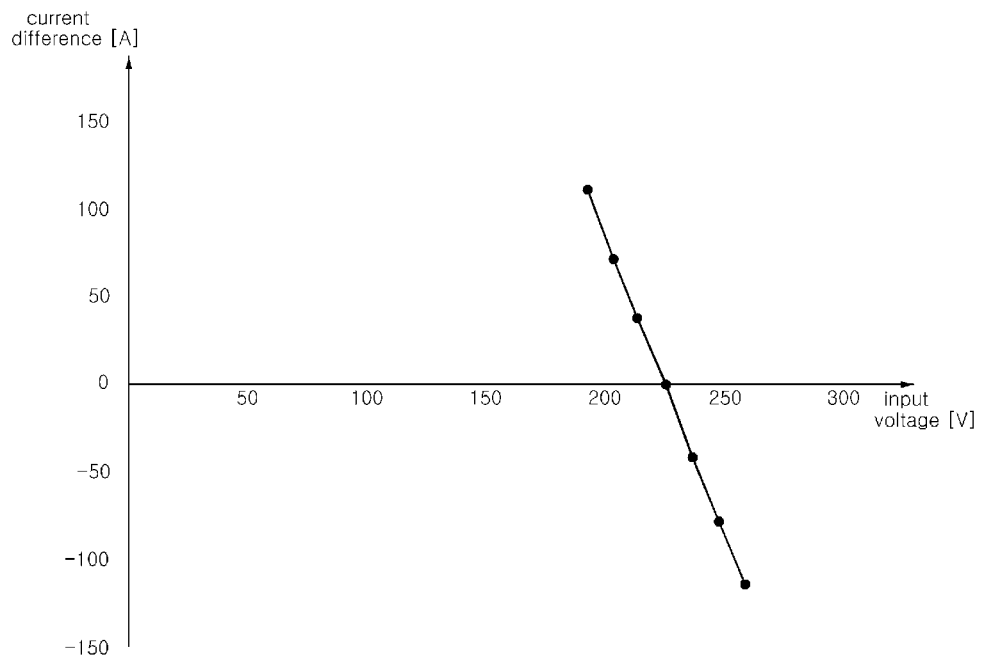
Figure 3B:
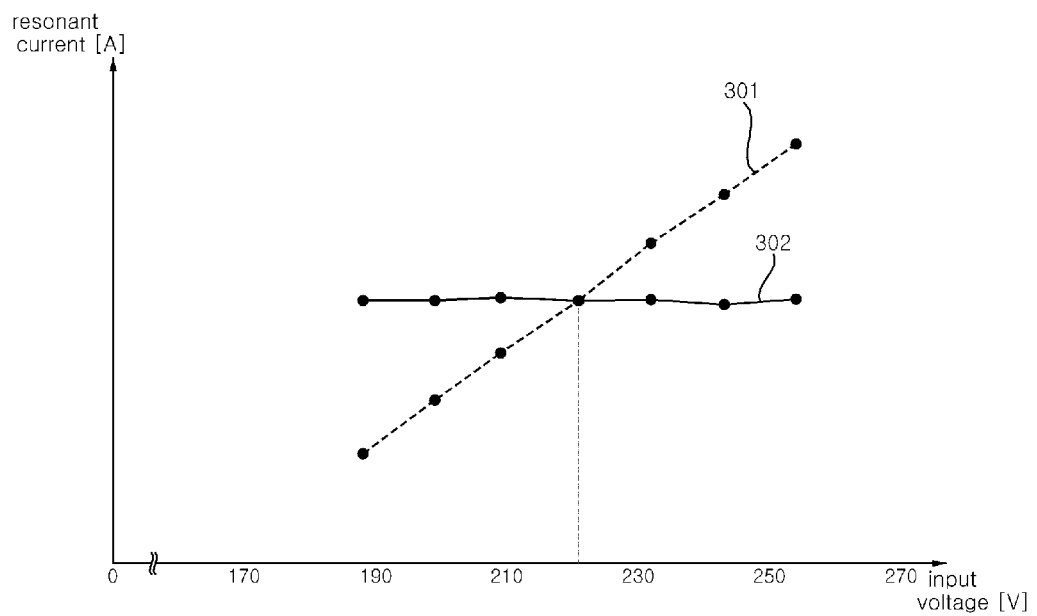

FIG. 3A is a diagram showing an exemplary graph of a variation in a magnitude of the resonant current Ir according to a variation of the input voltage Vin. FIG. 3B is a diagram showing an exemplary graph of the resonant current Ir compensated based on the input voltage Vin. For example, the frequency of the resonant current Ir can be constant.

Referring to FIG. 3A, the variation of the magnitude of the resonant current Ir according to the variation of the input voltage Vin is identified based on a current difference. The current difference can be a difference between a specific magnitude I2 of the resonant current Ir detected when a predetermined reference voltage (e.g. 220V) is supplied and a magnitude I1 of the resonant current Ir corresponding to the input voltage Vin.

As shown in FIG. 3A, the magnitude I1 of the resonant current Ir can increase as the input voltage Vin increases and decrease as the input voltage Vin decreases, based on the predetermined reference voltage (e.g. 220V).

That is, even when the material of the object to be heated disposed adjacent to the working coil 150 does not change, the size of the resonant current Ir can be differently detected according to the variation of the power supplied from the commercial power supply 201. For this reason, the result of determining the material of the object to be heated can be inaccurate.

Accordingly, the cooking apparatus 100 can compensate the detection value for the resonant current Ir based on a compensation equation such as the following Equation 1 below:

$$Ir' = a \times (220 - Vin) + Ir, \ a \text{ is a constant} \qquad \text{[Equation 1]}$$

Equation 1 above is a compensation equation in consideration of a variation of a magnitude of the AC voltage supplied from the commercial power supply 201.

In FIG. 3B, a graph 301 depicts detection values for the resonant current Ir before compensation and a graph 302 depicts detection values for the resonant current Ir after compensation.

Referring to FIG. 3B, the detection value of the resonant current Ir before compensation can vary greatly according to the variation of the input voltage Vin. In some implementations, the detection value of the resonant current Ir after compensation can be constant despite the variation of the input voltage Vin.

Accordingly, the cooking apparatus 100 can determine the material or type of the object to be heated more accurately, based on the detection value of the resonant current Ir compensated based on the input voltage Vin.

Referring to FIG. 2, in operation S230, the cooking apparatus 100 can determine whether the material of the object to be heated is magnetic, based on the first detection value for the first resonant current.

Figure 4:
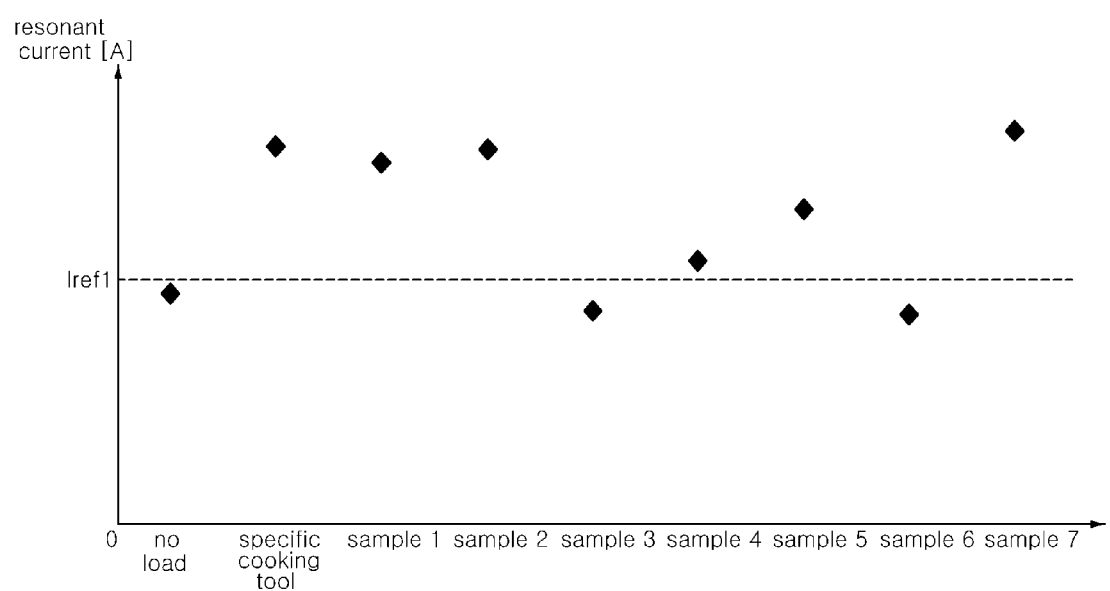

As shown in FIG. 4, the cooking apparatus 100 can determine the material of the object to be heated as the magnetic material when the magnitude of the first resonant current is greater than or equal to a predetermined magnitude (Iref1), and can determine the material of the object to be heated as the non-magnetic material when the magnitude of the first resonant current is less than the predetermined magnitude (Iref1).

In operation S240, when it is determined that the material of the object to be heated is the magnetic material, the cooking apparatus 100 can control the inverter 140 so that a second resonant current having a second frequency flows through the working coil 150. For example, the cooking apparatus 100 can control the switching elements S1 and S2 included in the inverter 140 so that the second resonant current having the second frequency flows through the working coil 150.

In operation S250, the cooking apparatus 100 can calculate a second detection value for the second resonant current. For example, the cooking apparatus 100 can calculate a magnitude of the second resonant current as the second detection value based on the detection value for the second resonant current output from the current detector B.

For example, the cooking apparatus 100 can calculate the second detection value for the second resonant current by compensating the detection value for the resonant current Ir based on the input voltage Vin detected through the voltage detector A.

In operation S260, the cooking apparatus 100 can determine whether the object to be heated is the predetermined specific cooking tool based on a difference between the first detection value and the second detection value.

Figure 5:
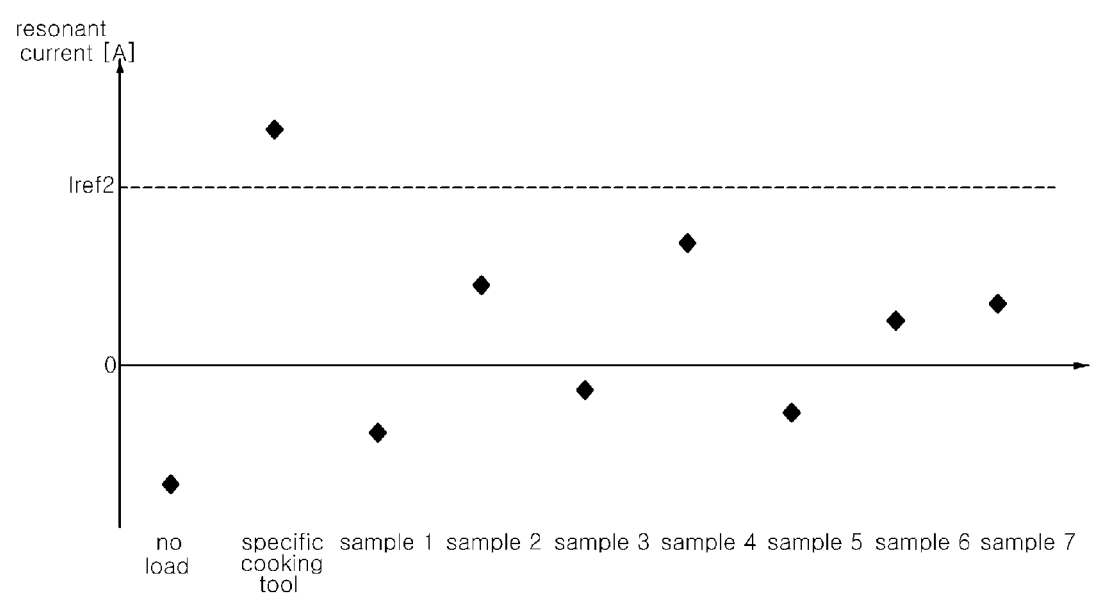
Figure 6A:
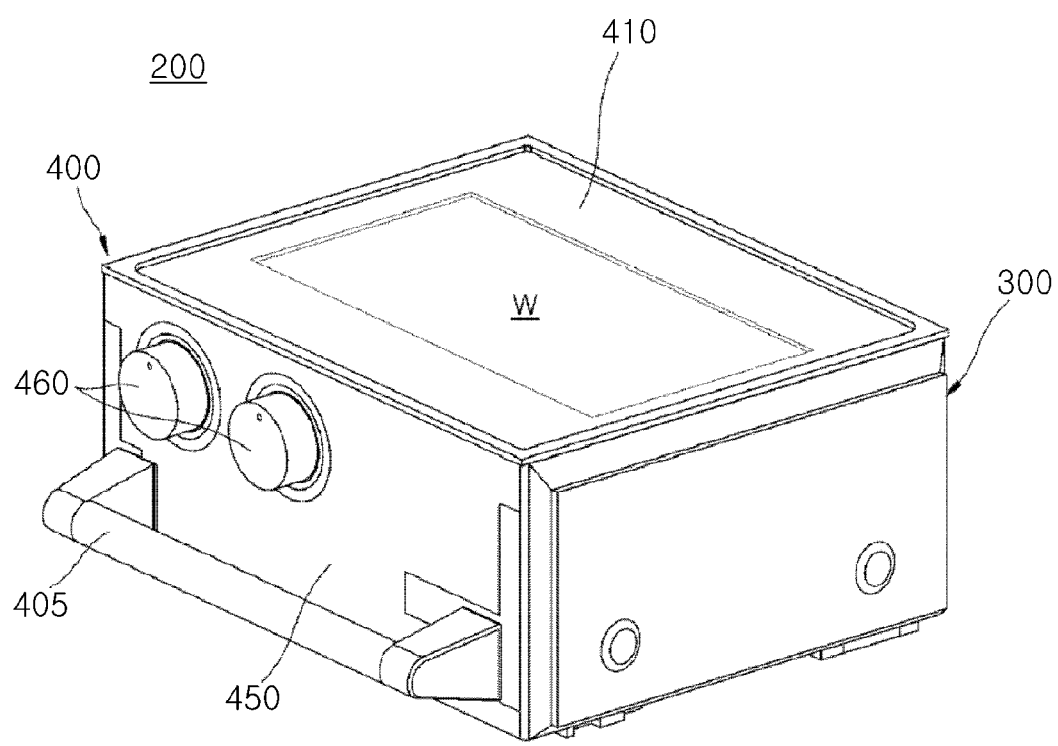
FIGS. 6A to 6D are diagrams referred to in explaining an implementation of an exemplary cooking apparatus.
Figure 6B:
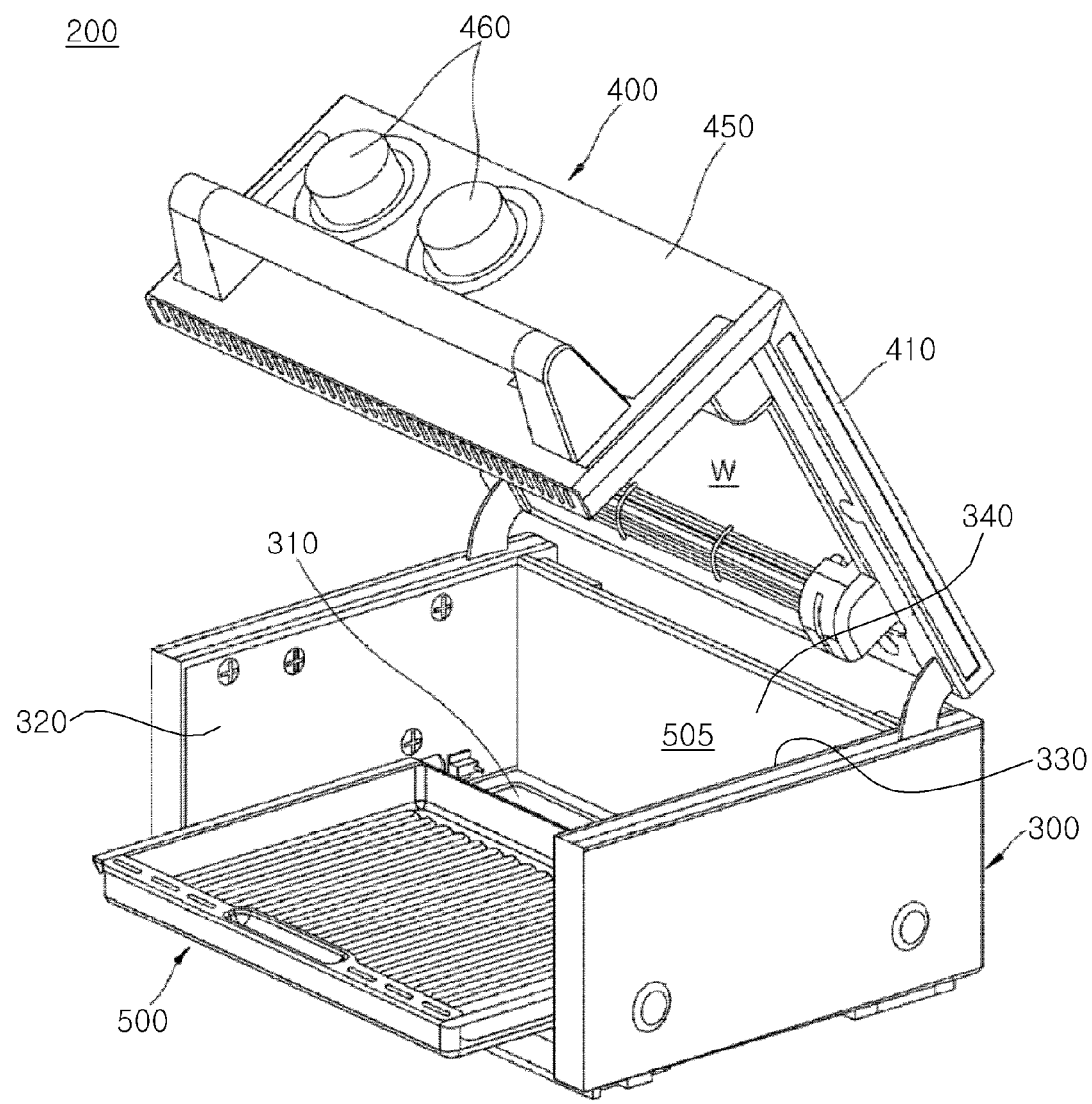
Figure 6C:
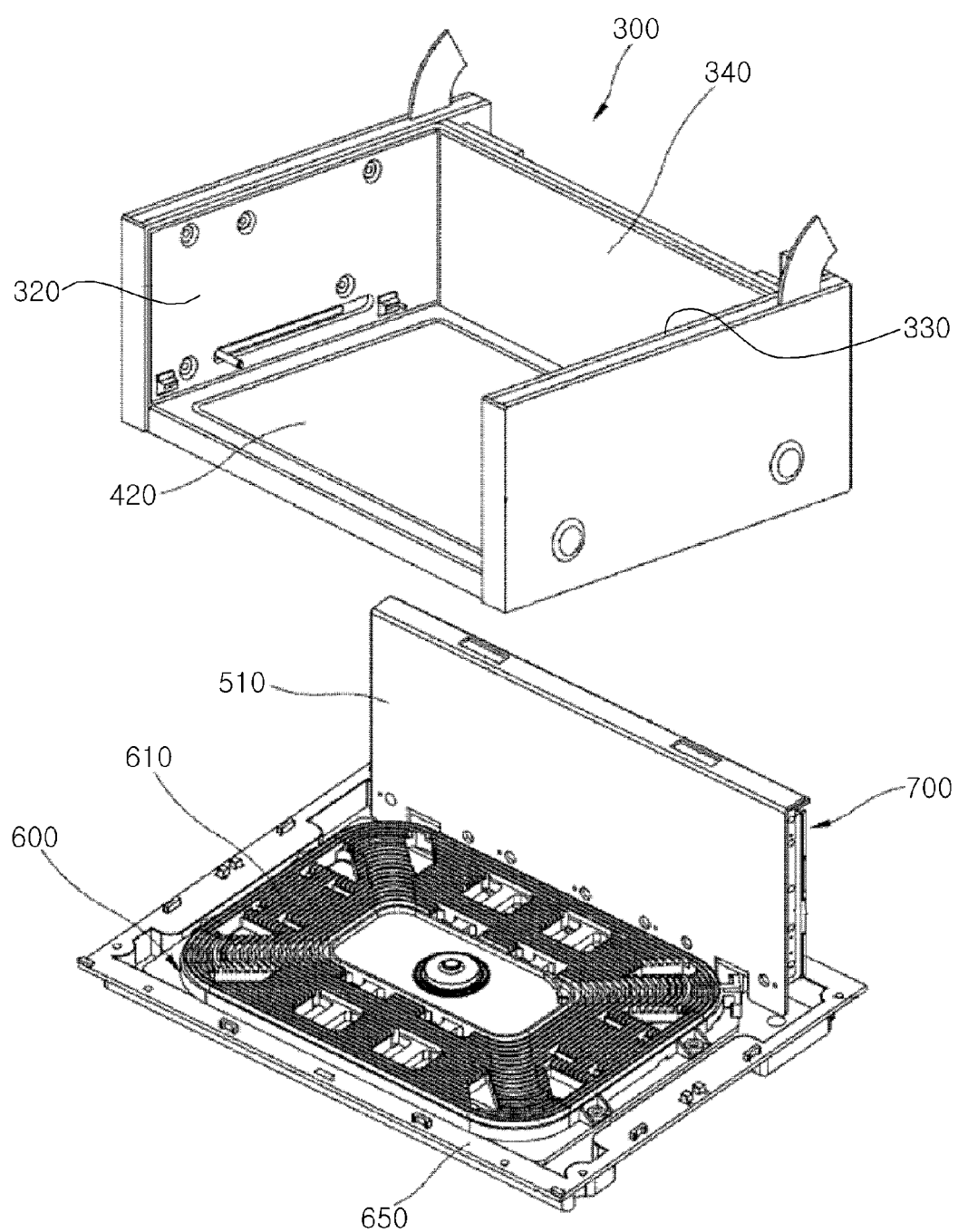
Figure 6D:
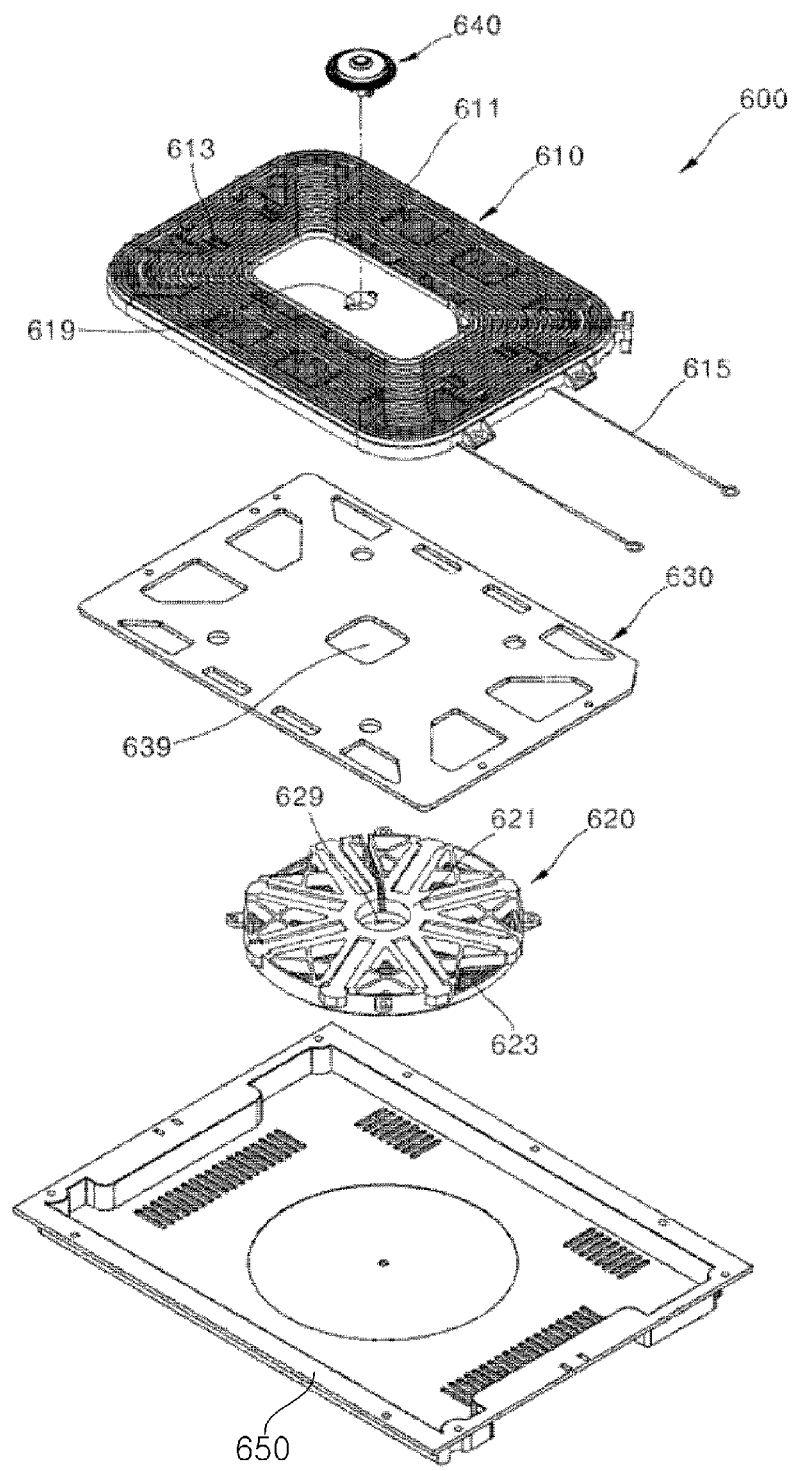

As shown in FIG. 5, the cooking apparatus 100 can determine the object to be heated as the predetermined specific cooking tool when the difference between the first detection value and the second detection value is greater than or equal to a predetermined difference Iref2, and can determine that the object to be heated is not the predetermined specific cooking tool when the difference between the first detection value and the second detection value is less than the predetermined difference Iref2

In operation S270, when it is determined that the object to be heated is the predetermined specific cooking tool, the cooking apparatus 100 can control the inverter 140 based on a preset control value for the predetermined specific cooking tool. For example, the cooking apparatus 100 can control the switching elements S1 and S2 included in the inverter 140 based on the preset control value.

In operation S280, when it is determined that the material of the object to be heated is non-magnetic, or when it is determined that the object to be heated is not the predetermined specific cooking tool, the cooking apparatus 100 can control the inverter 140 to stop operating.

In some implementations, the cooking apparatus 100 can accurately determine the material of the object to be heated and whether the object to be heated is the predetermined specific cooking tool, so that the cooking apparatus 100 can effectively limit the occurrence of safety problems and damage to elements of the cooking apparatus 100 due to an incorrect determination for the object to be heated.

Further, the cooking apparatus 100 can provide an optimum output corresponding to the object to be heated, thereby improving user satisfaction and reliability.

FIGS. 6A to 6D are diagrams referred to in explaining an implementation of an exemplary cooking apparatus.

Referring to FIGS. 6A to 6D, the cooking apparatus 200 can include a housing 300, a door 400, a tray 500, and a heating unit 600.

The housing 300 can form the exterior of the cooking apparatus 200. Several components constituting the cooking apparatus 200 can be respectively disposed in the housing 300, and a cooking chamber 505 can be formed in the housing 300 to provide a space for cooking food.

In some implementations, the housing 300 can be formed in a hexahedral shape with an open top and a front surface, but the present disclosure is not limited thereto.

The cooking apparatus 200 can form a space corresponding to the cooking chamber 505 inside the housing 300 surrounded by the bottom surface 310, both side surfaces 320 and 330, and the rear surface 340. The cooking apparatus 200 can be configured in a form in which an upper surface and a front surface can be opened.

For example, the housing 300 can constitute the exterior of the bottom surface 310, both sides 320 and 330, and the rear surface 340 of the cooking apparatus 200, and the door 400 can configure the top and front exteriors of the cooking apparatus 200.

For example, the door 400 can include a door upper surface portion 410 and a door front surface portion 450.

The door upper surface portion 410 forming the upper surface of the door 400 can correspond to a configuration that covers the upper surface of the housing 300 when the door 400 closes the cooking chamber 505 inside the housing 300.

The door front surface portion 450 forming the front of the door 400 can correspond to a configuration that covers the opened front surface of the housing 300 when the door 400 closes the cooking chamber 505.

A handle 405 can be disposed on the front of the door 400, and a user may open and close the cooking chamber 505 by holding the handle 405 and rotating the door 400 in the vertical direction.

An input unit 460 can include various switches for controlling the operation of the cooking apparatus 200. For example, the input unit 460 can include an operation switch for on/off of the heating unit 600 or heat control, a switch for adjusting an operating time of the heating unit 600, and the like.

The input unit 460 can be provided to be exposed to the door front surface portion 450, and a user can directly manipulate the input unit 460 to control the operation of the cooking apparatus 200.

The door 400 can include a see-through window W. The see-through window W can be disposed on the door upper surface portion 410 and can be located at a central portion of the door upper surface portion 410 in the plane direction. The user can look down on the inside of the cooking chamber 505 through the see-through window W from above, and through this, can check the cooking state of food in the cooking chamber 505.

The tray 500 can be disposed in the cooking chamber 505 formed inside the housing 300. The tray 500 can be detachably formed inside the cooking chamber 505.

In some implementations, the tray 500 can be provided to be pulled out to the front of the cooking chamber 505 for user convenience. The tray 500 can be formed to be movable in the front-rear direction by interlocking with the opening/closing operation of the door 400.

The heating unit 600 can be disposed inside the housing 300 to heat the tray 500 disposed in the cooking chamber 505.

The heating unit 600 can include a working coil 610 (e.g. a working coil 250) disposed under the bottom surface 310 of the housing 300 and control a high-frequency current to flow through the working coil 610.

A magnetic line of force generated by a high-frequency current flowing through the working coil 610 can pass through the tray 500, and an eddy current can be formed in the tray 500 by the magnetic line of force passing through the tray 500. Further, as the tray 500 is heated by the eddy current formed in the tray 500, the food in the tray 500 can also be heated. To this end, the tray 500 can be formed of a material capable of induction heating by the heating unit 600.

The working coil 610 can include a first base 611. In some implementations, the first base 611 can be formed in a square shape close to the shape of the tray 500.

A groove can be formed in the upper part of the first base 611. The first coil 613 can be disposed in the groove formed on the first base 611 and can be tightly wound and fixed on the first base 611.

At an end of the first coil 613, a first connection wiring 615 connected to a coil control PCB for controlling the first coil 613 can be provided. A high-frequency current can flow through the first connection wiring 615 to the first coil 613.

The heating unit 600 can further include a receiving coil 620 (e.g. a receiving coil 210).

The receiving coil 620 can be configured to receive power transmitted wirelessly and can be disposed under the heating unit 600.

A base 650 can be disposed under the receiving coil 620. The base 650 can be coupled to the bottom surface 310 of the housing 300 to support the working coil 610, and can support the working coil 610, the receiving coil 620, and the like under the receiving coil 620. The base 650 can form the exterior of the bottom surface of the cooking apparatus 200.

The receiving coil 620 can include a second base 621 and a second coil 623 like the working coil 610. In some implementations, the second base 621 of the receiving coil 620 can be formed in a circular shape different from the shape of the first base 611 of the working coil 610.

The heating unit 600 can further include a shielding plate 630 disposed between the working coil 610 and the receiving coil 620. The shielding plate 630 can be made of a metal material such as aluminum. The shielding plate 630 can minimize the effect of the EMI caused by the working coil 610 on the receiving coil 620 and the effect of the EMI caused by the receiving coil 620 on the working coil 610.

For example, the shielding plate 630 can block electromagnetic fields and electromagnetic waves located in the space above the shielding plate 630 from affecting the lower space of the shielding plate 630. Further, the shielding plate 630 can block electromagnetic fields and electromagnetic waves existing in a space lower than the shielding plate 630 from affecting the upper space of the shielding plate 630.

The heating unit 600 can further include a temperature sensor 640. The temperature sensor 640 can measure the temperature of the tray 500 or the temperature inside the cooking chamber 505 in which the tray 500 is disposed.

The heating unit 600 can be configured such that the centers of the working coil 610, the receiving coil 620, and the shielding plate 630 are all aligned.

For example, a first central hole 619 can be formed in the center of the working coil 610, a second central hole 629 can be formed at the center of the receiving coil 620, and a third central hole 639 can be formed in the center of the shielding plate 630.

What is claimed is:

1. A cooking apparatus comprising:
    a working coil;
    an inverter configured to output a resonant current to the working coil;
    a current detector configured to detect the resonant current and output a detection value corresponding to the resonant current;
    a voltage detector configured to detect an input voltage to the cooking apparatus; and
    a controller configured to:
        control the inverter to flow a first resonant current through the working coil,
        control the inverter to flow, through the working coil, a second resonant current having a frequency different from the first resonant current,
        compensate (i) a first detection value for the first resonant current based on the detected input voltage and (ii) a second detection value for the second resonant current based on the detected input voltage,
        determine, based on a difference between the compensated first detection value and the compensated second detection value, whether a target object that is located adjacent to the working coil is a predetermined object, and
        control, based on the target object being the predetermined object, the inverter according to a preset control value for the predetermined object, to thereby heat the target object.

2. The cooking apparatus according to claim 1, wherein the controller is configured to determine whether a material of the target object is magnetic.

3. The cooking apparatus according to claim 1, wherein the current detector includes at least one of a current sensor, a current transformer, or a shunt resistor.

4. The cooking apparatus according to claim 2, wherein the controller is configured to:
    determine, based on the compensated first detection value being greater than or equal to a predetermined reference value, whether the material of the target object is magnetic, and
    determine, based on the difference between the compensated first detection value and the compensated second detection value being greater than or equal to a predetermined difference, whether the target object is the predetermined object.

5. The cooking apparatus according to claim 4, wherein the controller is configured to stop the inverter based on the material of the target object being non-magnetic or the target object not being the predetermined object.

6. The cooking apparatus according to claim 5, wherein the controller is configured to control, based on the material of the target object being magnetic and the target object being the predetermined object, the inverter according to the preset control value for the predetermined object.

7. The cooking apparatus according to claim 6, wherein the controller is configured to determine, based on the material of the target object being magnetic, whether the target object is the predetermined object.

8. The cooking apparatus according to claim 7, wherein the controller is configured to determine, based on the compensated first detection value, whether the material of the target object is magnetic.

9. The cooking apparatus according to claim 8, further comprising an output unit including at least one of a display or a speaker,
  wherein the controller is configured to:
    output, based on the material of the target object being non-magnetic, a message indicating that the target object has non-magnetic material through the output unit, and
    output, based on the target object not being the predetermined object, a message instructing a user to use the predetermined object through the output unit.

10. The cooking apparatus according to claim 8, wherein the voltage detector includes at least one of a voltage transformer, a resistance element, or an operational amplifier.

* * * * *